Oct. 20, 1964  R. E. RICHARDSON  3,153,582
GLASS BENDING MOULD WITH SAG INDICATING MECHANISM
Original Filed Jan. 29, 1957  9 Sheets-Sheet 1

INVENTOR
Ronald E. Richardson
BY Cushman, Darby & Cushman
ATTORNEYS

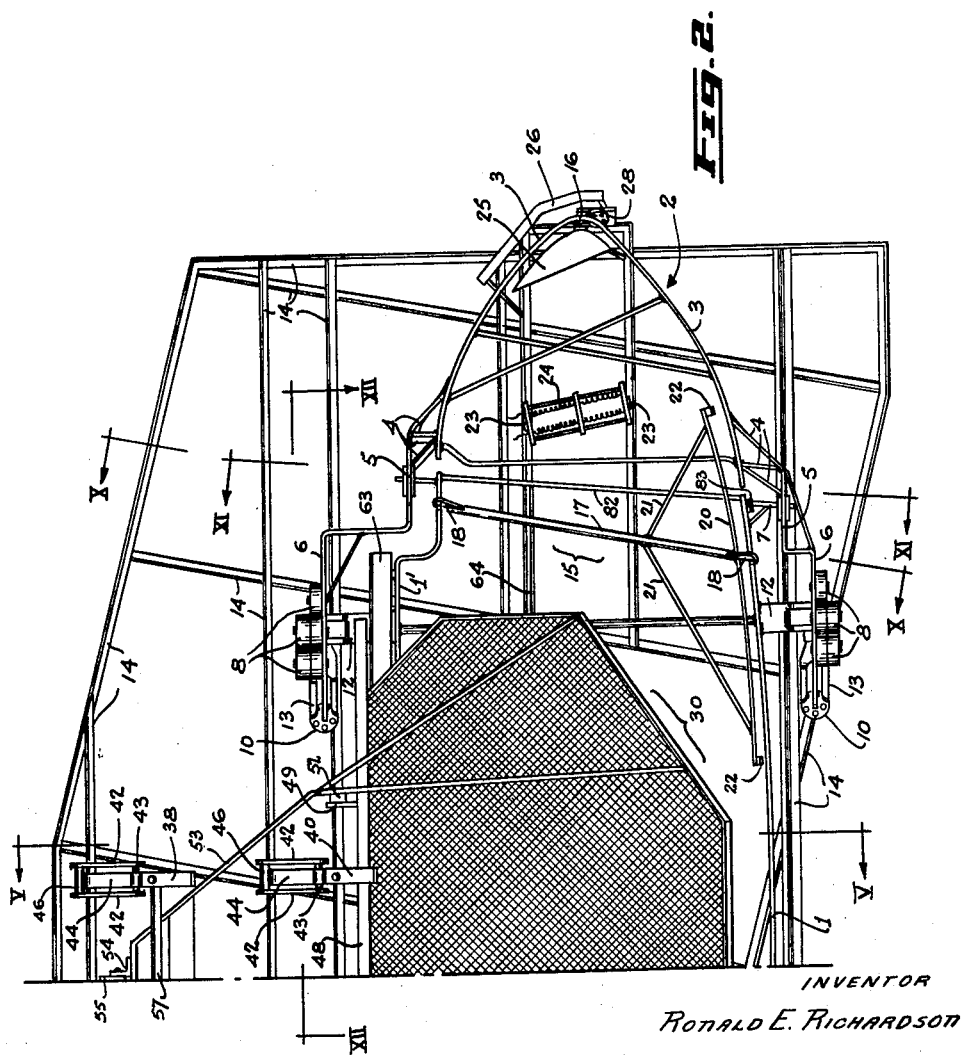

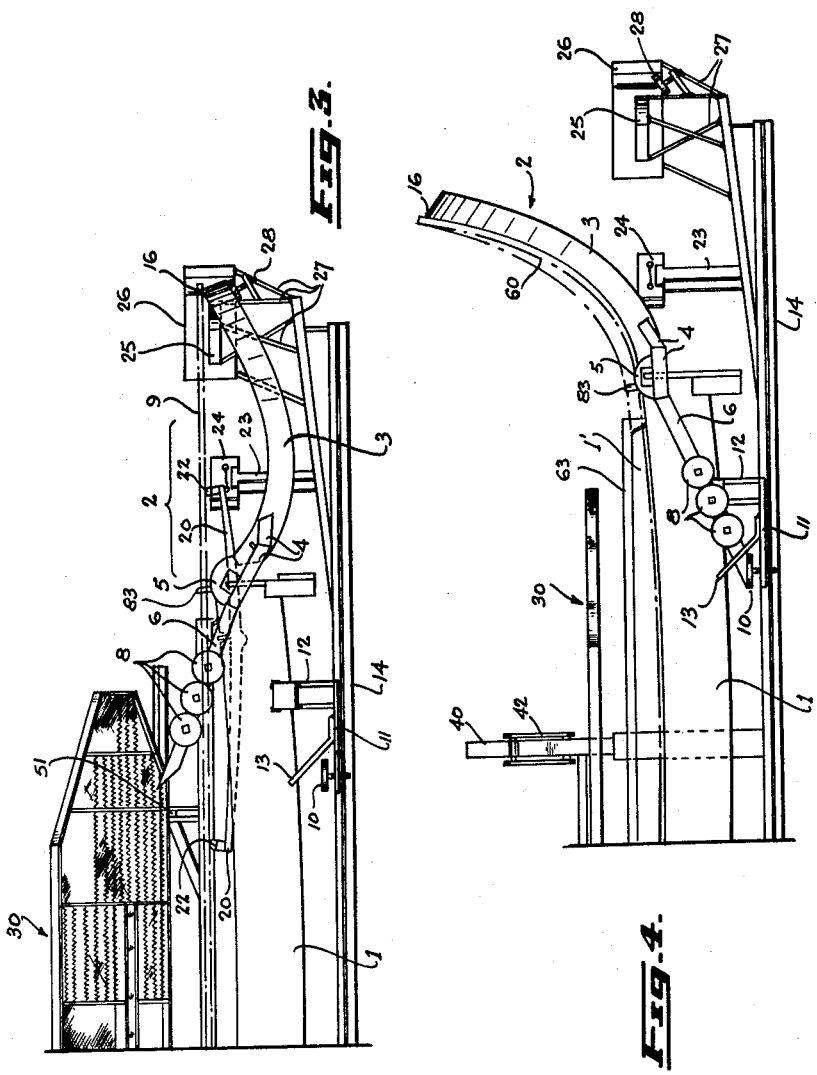

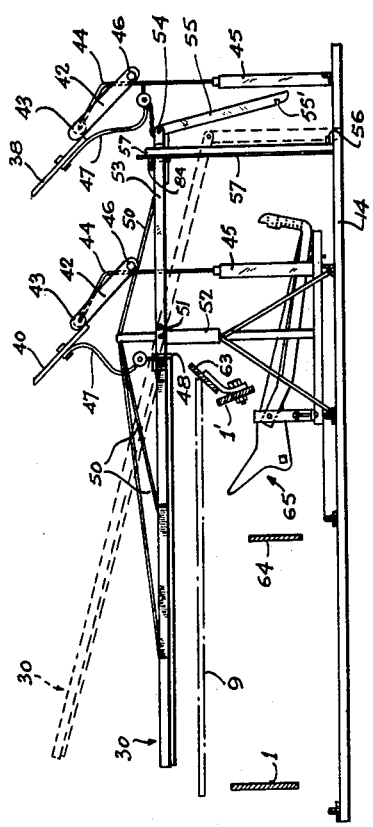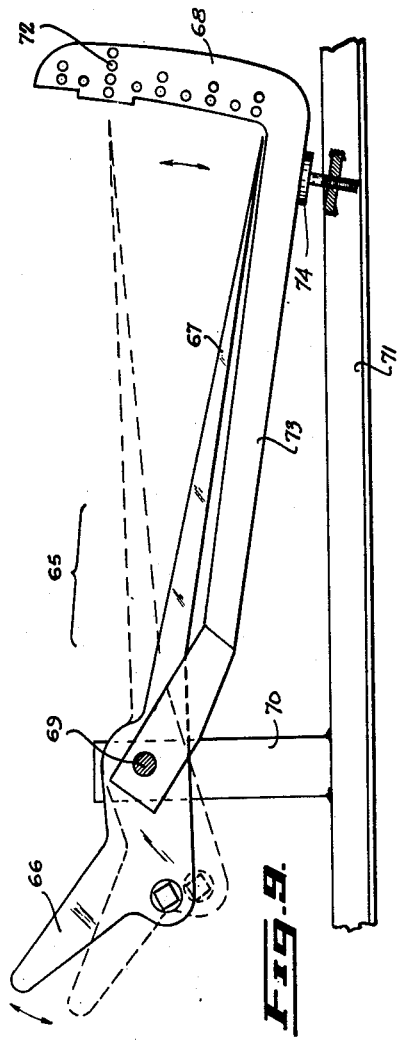

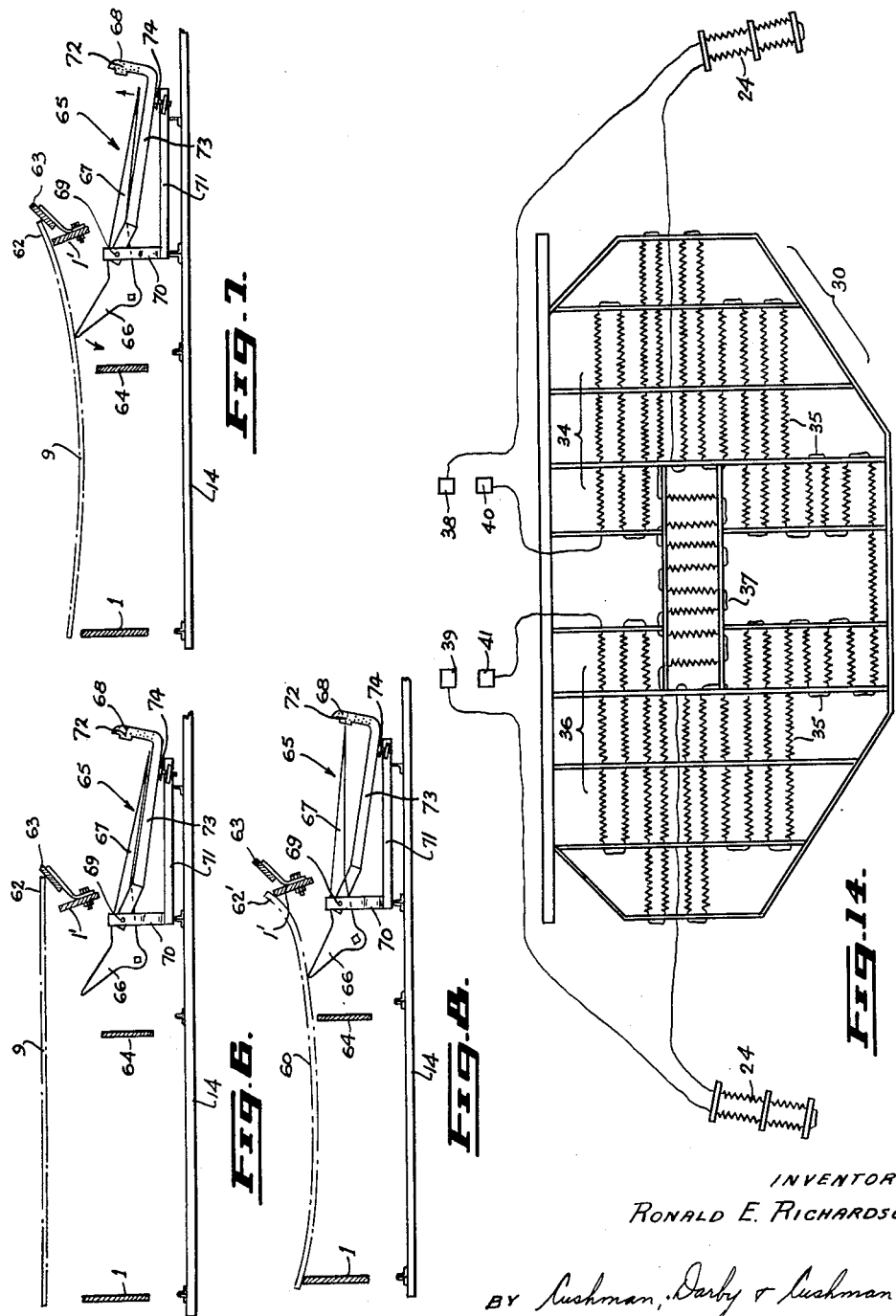

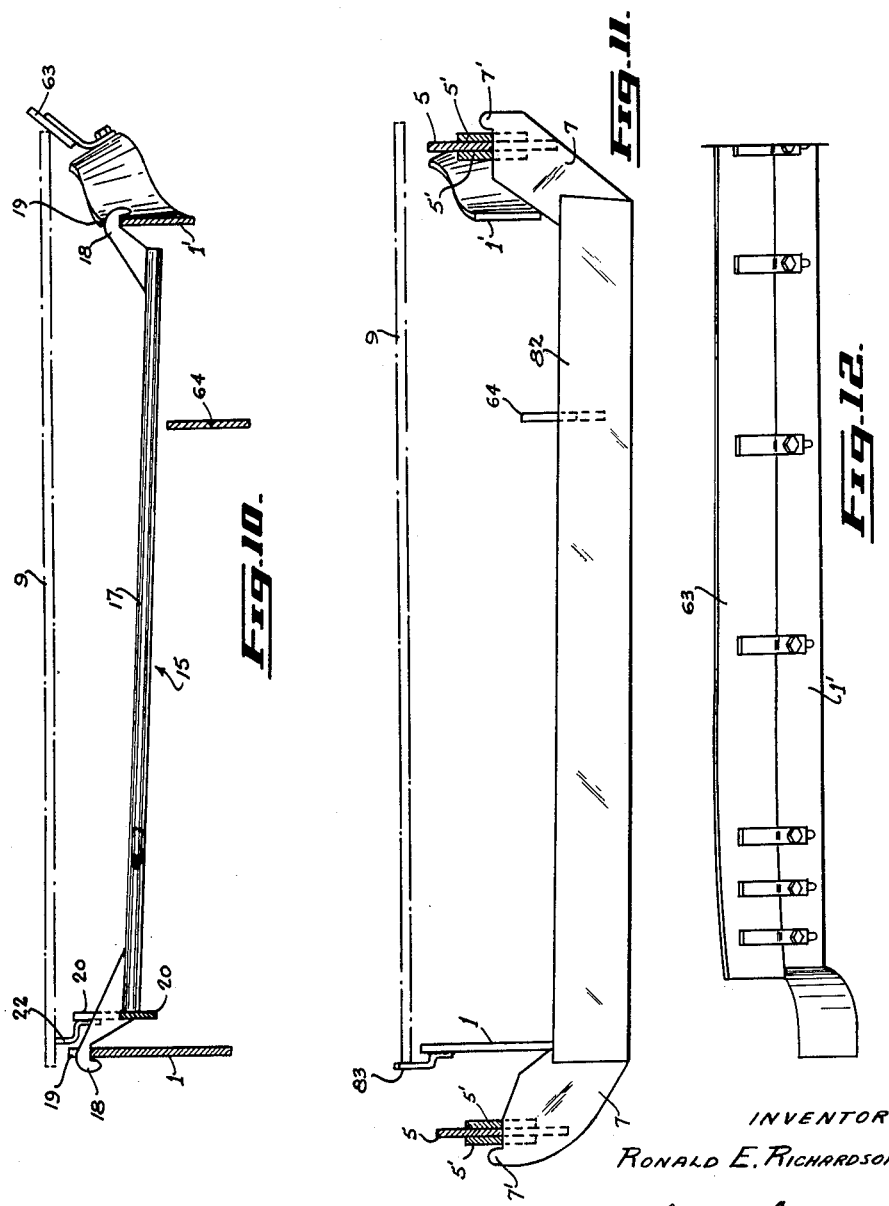

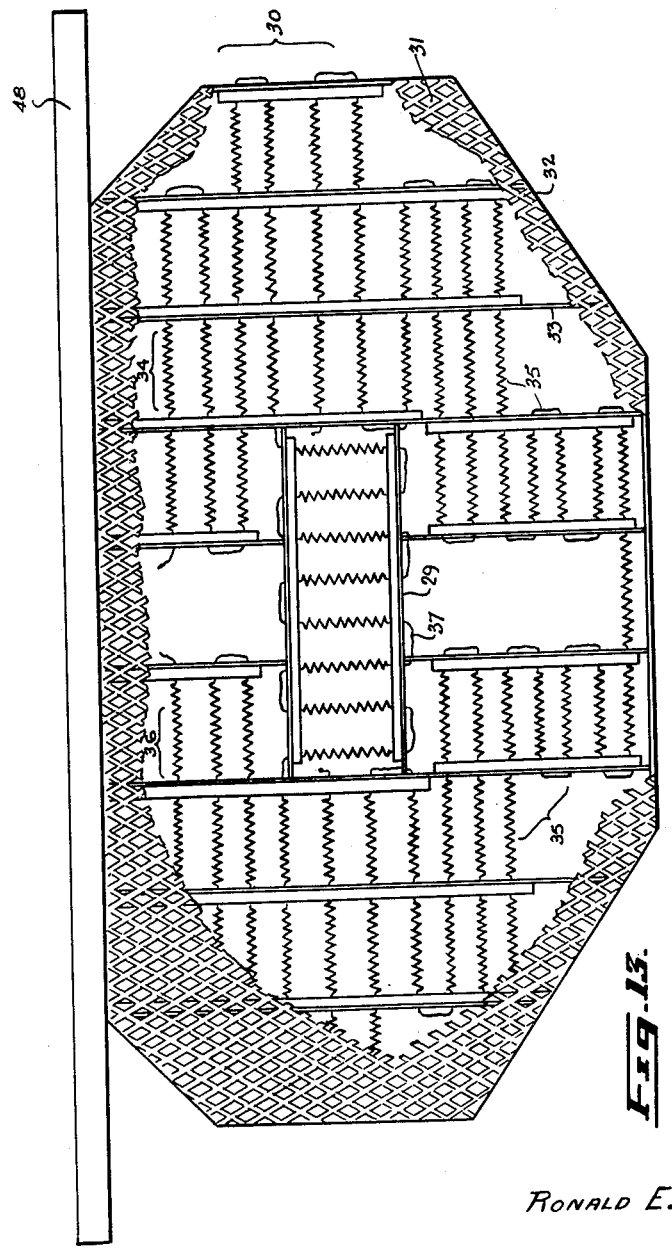

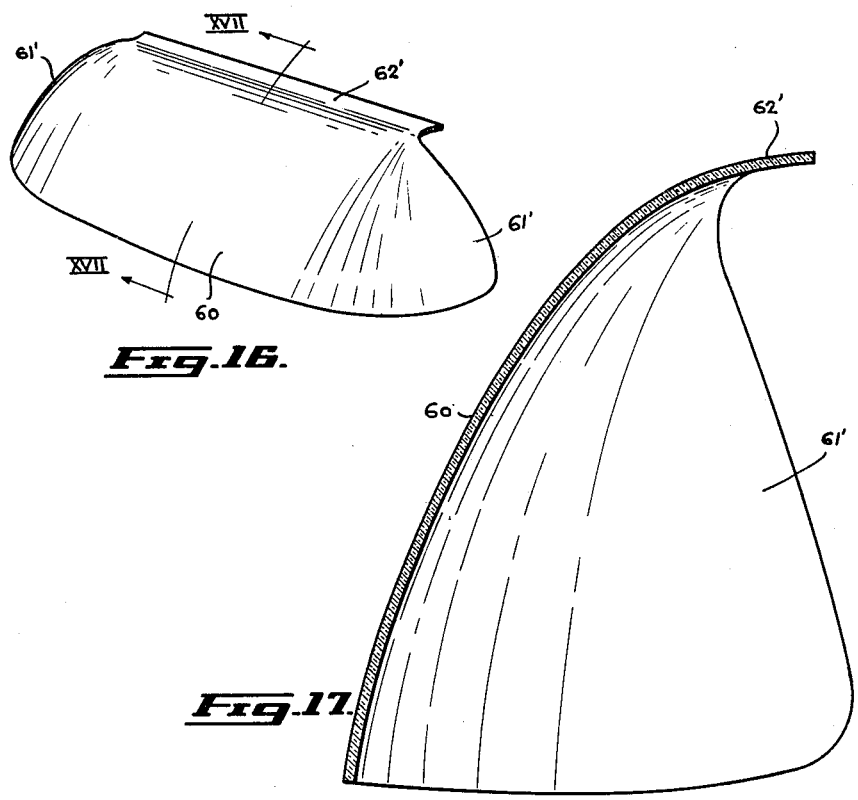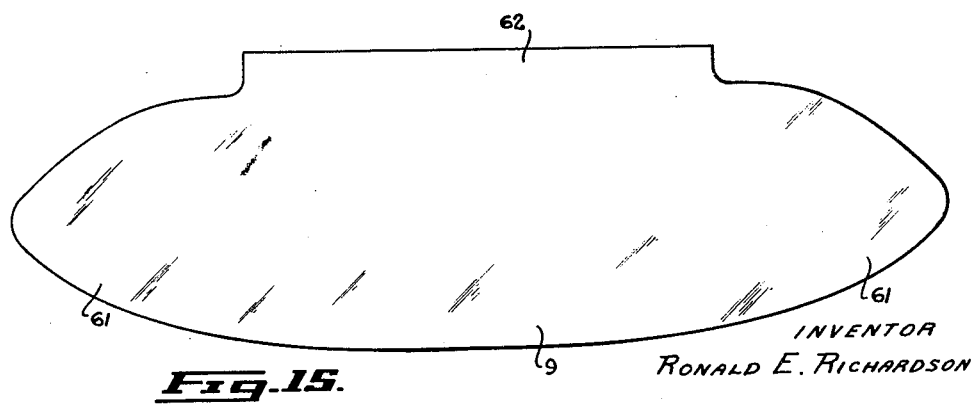

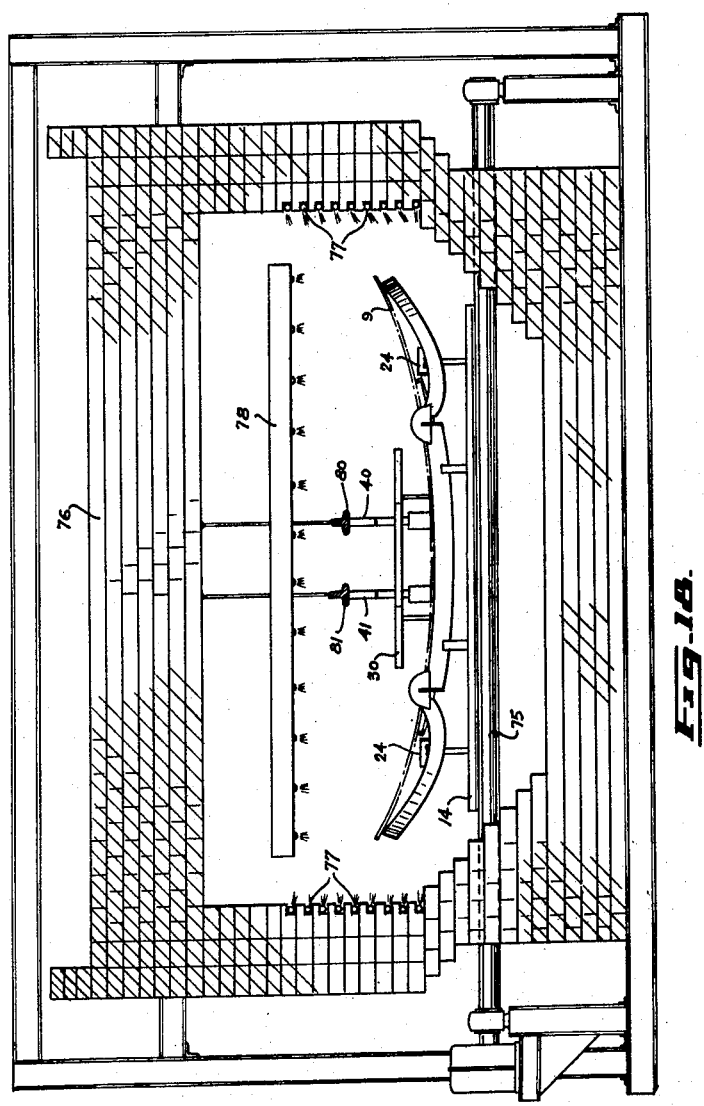

3,153,582
GLASS BENDING MOULD WITH SAG
INDICATING MECHANISM
Ronald E. Richardson, 289 Woodlea Ave.,
Oshawa, Ontario, Canada
Original application Jan. 29, 1957, Ser. No. 636,965, now
Patent No. 2,999,338, dated Sept. 12, 1961. Divided
and this application July 3, 1961, Ser. No. 121,544
4 Claims. (Cl. 65—158)

This invention relates to improvements in glass bending moulds, and is particularly directed towards a construction of mould designed for manufacture of bent glass for use in the manufacture of laminated windshields. The present application is divided from copending application Serial No. 636,965, filed January 29, 1957, now Patent No. 2,999,338, issued September 12, 1961.

In particular, the mould of the present invention is directed towards the manufacture of windshields having compound curvature, that is to say curvature in the transverse direction as well as in the longitudinal direction.

The invention is illustrated by way of example in the accompanying drawings which show various views of a concave, skeleton type glass bending mould.

FIGURE 2 is a plan view on an enlarged scale of the right-hand half of the mould seen in FIGURE 1 with the parts in the "flat" orientation.

FIGURE 3 is a side view of the main parts of the mould half of FIGURE 2, these parts being in the "flat" orientation and in the loading position for receiving a fresh unbent sheet of glass.

FIGURE 4 is a view of the same parts as those seen in FIGURE 3, but showing them in the positions occupied after bending a sheet of glass.

FIGURE 5 is a partial section on the line V—V in FIGURE 2.

FIGURE 6 is a fragment of FIGURE 5 illustrating the position of the glass prior to bending.

FIGURE 7 is a view similar to FIGURE 6, showing the parts at an intermediate stage during the bending operation.

FIGURE 8 is a further view similar to FIGURES 6 and 7 and showing the position of the parts at the conclusion of the bending operation.

FIGURE 9 is a detailed enlarged view of the pointer mechanism seen in FIGURES 5 to 8.

FIGURE 10 is a partial section taken on the line X—X in FIGURE 2.

FIGURE 11 is a partial section taken on the line XI—XI in FIGURE 2.

FIGURE 12 is a rear view of a fragment of the apparatus as seen from the line XII—XII in FIGURE 2.

FIGURE 13 is an enlarged broken away plan view of the upper heater unit carried by the mould.

FIGURE 14 is a schematic circuit diagram of the heater connections.

FIGURE 15 is a plan view of a sheet of unbent glass prior to mounting on the mould for bending.

FIGURE 16 is a typical bent sheet of glass for forming a windshield and illustrates a product of the mould seen in the foregoing drawings.

FIGURE 17 is a transverse section on the line XVII—XVII in FIGURE 16.

FIGURE 18 is a transverse section through a typical heating lehr.

Figure 1:
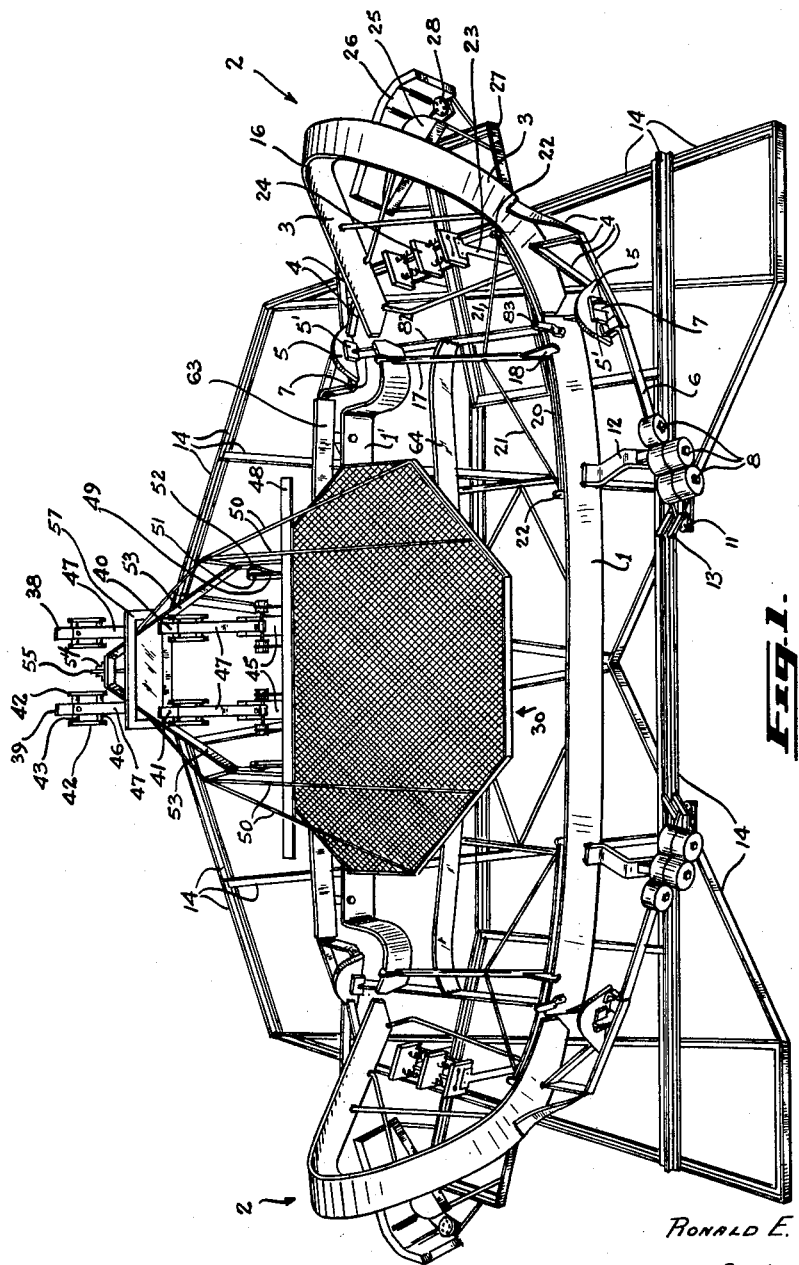
FIGURE 1 shows a front perspective general view of the whole mould in its curved orientation.

The mould consists of vertically disposed elongated side bars 1 and 1' defining the edges of the main, central, stationary portion of the mould. At each end of this central portion there is a pivotally mounted end portion 2. For simplicity with the exception of FIGURE 1 which shows an overall view, many of the figures have been restricted to illustration of only the right-hand end of the mould with the right-hand end mould portion 2. As appears from FIGURE 1, the two ends are identical in mirror image.

Each end portion 2 consists principally of a bent vertically disposed bar 3 each end of which forms, in the curved orientation of the mould, a contiguous continuation of one of the side bars 1, 1'. Each end of the bar 3 is connected by means of struts 4 to a semi-circular plate 5, the plates 5 serving to mount the end mould portion 2 pivotally on a pair of vertically upstanding plates 7. At this point, attention is directed to FIGURES 1 and 11 which demonstrate the manner of bracing the plates 5 with small side plates 5' secured to each side thereof, and the upstanding ends 7' on the plates 7, which maintain the parts in the correct position transversely. A bar 82 extends across the mould to join the two plates 7 and the bars 82 are themselves joined by a longitudinal bar 64. Stops 83 project upwardly from each end of side bar 1 to prevent forward movement of the glass when in position on the mould.

The struts 4 and plate 5 on each side of the mould also serve to connect arms 6 to each end mould portion 2. These arms 6 each carry a series of weights 8. The weights 8 cause movement of the end mould portions 2 between the "flat" orientation of FIGURES 2 and 3 in which they are initially held by the weight and rigidity of the glass (shown at 9 in broken lines in FIGURE 3), and the curved orientation of FIGURES 1 and 4 to which the mould moves when the glass begins to soften under the application of heat, allowing the weights to take charge. The final limit of this movement is determined by adjustable stops 10 supported on shelves 11 secured by brackets 12 to the lower part of respective side members 1 and 1'. Each shelf 11 also carries a forked guide member 13 into which the end of each arm 6 moves. The guide members 13 further ensure proper registration of the parts. The brackets 12 also serve to secure the side bars 1 and 1' and the other fixed parts of the mould to a supporting framework 14 which consists of a series of longitudinal and transverse angle members which form an extended horizontal base or platform on which the mould rests and by which it is supported on rollers 75 when passed through a heating lehr 76 (see FIGURE 18).

Mounted near each end of the main portion of the mould is a "teeter" device 15 which is used to provide additional supports for the glass intermediate the end tips 16 of the end mould portions 2 prior to and during bending. This teeter device 15 (see FIGURES 1, 2 and 10) consists of a transversely extending rod 17 which is pivotally mounted at each end by hook members 18 in recesses 19 formed in the respective side members 1 and 1', and a longitudinally extending, gently downwardly bowed bar 20 on the front side of the mould, which is secured to the rod 17 and held in place by bracing members 21. On each end the bar 20 carries an upstanding lug 22 which lies closely inwardly of the side bar 1. In the "flat" orientation of the mould these lugs 22 project well above the level of the mould surfaces, as seen from FIGURE 3, and serve to support the glass 9 in this position. As the mould turns into the curved orientation of FIGURE 4, the lugs 22 come to lie below the curved plane defined by the undersurface of the glass 9 and no longer have any supporting action on the glass.

Mounted on the framework 14 by means of upwardly extended supports 23, at each end of the mould, is a heater 24 which lies, in the "flat" orientation of the mould, just below the surface of the glass (see FIG. 3) and in a position directly beneath the line of maximum bending of the glass.

Adjacent the tip 16 of each end mould portion 2 there is mounted a thermal ballast device. This thermal ballast device has two parts, an internal plate 25 (within the perimeter of the bar 3) and an external plate 26 (outside the bar 3). Both of these plates are mounted on a support structure 27 extending upwardly from the framework 14. The function of these plates is to delay heating of the extreme tips of the glass during the early stage of the bending operation.

An adjustable stop 28 is also mounted on the support structure 27, this stop 28 determining the limit of downward movement of the end mould portion 2 in the "flat" orientation.

Centrally of and above the main stationary portion of the mould there is mounted an upper heater assembly designated generally by the reference numeral 30. This assembly consists of a flat sheet of perforated or expanded metal 31 mounted in a peripheral frame 32 of mild steel bars (see especially the cutaway view of FIGURE 13). Arranged beneath the sheet 31 and supported on transverse bars 33 are a number of heater elements 34, 35 and 36 each consisting of coils extending parallel to one another and in the longitudinal direction of the mould. Centrally of the assembly formed by such elements, there is arranged a heater element 37 supported on longitudinal bars 29 connected to the transverse bars 33, the coils of the central element 37 extending parallel to one another and in the transverse direction of the mould. As best seen from FIGURE 14 which provides a schematic circuit diagram showing the electrical connections, a first circuit extends from a first contact 38 through one of the end heaters 24, through the element 35 of the heater assembly 30 and back through the other end heater 24 to a second contact 39, while a second circuit extends from a contact 40 through the heating elements 34, 36 and 37, back to a further contact 41.

When the mould travels along a heating lehr, the contacts 38 to 41 press upwardly against bus-bars 80 and 81 extending along the central upper part of the lehr 76. Attention is directed to FIGURE 18 which also shows conventional wall heaters 77 and ceiling heaters 78 in the lehr 76.

The positions of the contacts 38, 39, 40 and 41 in relation to the remainder of the mould parts is best appreciated from FIGURES 1, 2 and 5. Each of such contacts is secured to a pair of spaced bars 42 by means of a pin 43 whereby the assembly formed by such bars and the contact is pivotally mounted on the end of a forwardly bent upper portion of a support member 44 which projects upwardly from an insulated mounting 45 secured to the framework 14. The other ends of the two bars 42 are connected together by a pin 46 which bears against the rear surface of the support member 44 to limit clockwise rotation of the assembly, each such contact assembly tending to rotate in the clockwise direction because the weight of the parts on the right-hand side of the pivot pin 43 as seen in FIGURE 5 is greater than on the left-hand side. In use these contacts will be rotated slightly anticlockwise by the bus-bars when in the lehr, so that the weight biasing these assemblies for clockwise rotation will provide the required contact pressure between contacts and bus-bars. Electrically conducting straps 47 connect each of the contacts to fixed wiring which is not fully shown in the structural illustrations, but is represented in the wiring diagram of FIGURE 14.

Contacts 38 and 40 receive current from bus-bars 80 and contacts 39 and 41 from bus-bar 81. Thus as the mould travels through the lehr with the side which has been considered as the rear of the mould leading, contacts 38 and 39 will be the first to engage the ends of the bus-bars 80 and 81. These bus-bars do not extend along the first portion (pre-heating section) of the mould, but commence at a convenient position in the second or "bending" section of the mould, where, once the glass has been raised to a comparatively high temperature in the pre-heat section, just the correct degree of further heating is employed to produce the required bending. Similarly, of course, the bus-bars do not extend into the annealing or cooling sections which follow the bending section.

Close control over the intense but short duration local heating provided by the end heaters 24 and heater 30 is important if accurate finish products are to be obtained. As previously mentioned, contacts 38 and 39 are first to make contact with the bus-bars 80 and 81 and these energise both heaters 24 at the end elbows and heater element 35 which is comparatively centrally situated over the glass—perhaps somewhat on the side of the bar 1. Then, a few seconds later, the contacts 40 and 41 engage the bus-bars and elements 34, 36 and 37 are energised to provide intense local heating along the area above and slightly inwardly of the side bar 1' in the longitudinally central area of the mould. The division of the energy between two approximately equal circuits and two pairs of contacts is found desirable in view of the heavy total load.

It will be noted that the bus-bars 80 and 81 extend along the lehr near the centre thereof, the contacts 38, 39, 40 and 41 being correspondingly positioned near the longitudinal centre of the mould. This is in contradistinction to prior systems in which the bus-bars have been mounted to extend along the lehr near the side walls thereof. The present arrangement in which the bus-bars are centrally located has advantages in operation. Any slight twisting of the mould from its true orientation will be less likely to cause misalignment of contacts located centrally. Consequently the chance of the electrodes binding against fixed parts and arresting passage of the mould is much reduced. If one contact should become welded to a bus-bar as a result of excessive sparking, there would be less turning moment acting on the mould, and the effects of thermal expansion of the mould parts in producing misalignment will be minimised. Finally contacts mounted as in the present mould will tend to interfere little with the heat transfer conditions in the lehr, especially in respect of the end regions of the mould, which tend to be sensitive to shadow effects.

As best seen in FIGURES 1, 2 and 5, the heater assembly 30 is secured to a base bar 48 extending along the rear edge of such assembly. Arms 49 projecting rearwardly from such bar 48 serve to mount the assembly pivotally about pins 51 each carried by an insulated mounting 52 secured to the framework 14. Struts 50 increase the rigidity of the assembly. Further arms 53 project rearwardly from the base bar 48 and converge to a lug 54 from which there depends a bar 55 which carries at its lower end a recess 55' which may be engaged over a projection 56 formed at the foot of an upstanding framework 57, the head of which carries an adjustable stop 84 which determines the limit of downward movement of the heater assembly 30. The heater assembly 30 is thus pivotally movable between the full line position shown in FIGURE 5, and the broken line position shown in the same figure (also illustrated in FIGURE 3 in full lines), the heater being moved to this position when it is desired to load or unload glass onto or from the mould.

As evident from FIGURES 1 and 2, the side bar 1' at the rear of the mould, unlike the front side bar 1, is angled at each end so that the central portion of this bar is displaced towards the rear of the mould while being inclined inwardly (see also FIGURE 10). This part of the bar 1' is that on which the apron of the glass finally rests. Reference may be made at this point to FIGURE 15 which shows the shape of a sheet of glass prior to bending. This glass 9 is formed with the usual pointed ends 61 and an apron 62. FIGURES 16 and 17 illustrate the functions that these parts play when the glass has been bent to curved configuration to form a windshield 60, the pointed end portions 61 forming wrap-around ears 61' and the apron 62 forming a brow 62' which, when the windshield is mounted in an automobile, extends substantially horizontally and rearwardly from the upper edge of the remainder of the windshield.

Rearwardly of this central portion of the side bar 1' there is positioned a supporting shelf 63 which extends along behind such side bar 1 and is slightly curved downwardly at its ends, as best seen in FIGURE 12. When the glass 9 in the flat condition is placed on the mould, the apron 62 of the glass rests on the shelf 63. This is shown in FIGURE 6. The other points of support of the glass are the tips 16 of the end mould portions 2 and the lugs 22 of the teeter devices 15.

FIGURES 7 and 8 show two subsequent stages in the bending of the glass as the mould is passed through the lehr. Both longitudinal and transverse bending takes place simultaneously. The forward edge of the glass tends to sink down into contact with the side bar 1. Due to the additional heat supplied by the heater 30, the transverse bending is greatest towards the rear of the mould and the glass bends down until it has finally been bent to the required shape when it is supported wholly by the side members 1 and 1' and no longer rests on the shelf 63. This condition is shown in FIGURE 8.

The central transverse member 64 seen in these figures play no part in the glass bending operation but is merely a strengthening member extending between the two bars 82.

The degree of bending of the glass is detected by a pointer mechanism 65 seen in FIGURES 6, 7 and 8, and, on an enlarged scale, in FIGURE 9. This mechanism consists of a feeler 66 arranged to come into contact with a central portion (in the longitudinal direction) of the undersurface of the glass. The feeler 66 is pivotally mounted about a pin 69 supported by upstanding projections 70 on a base 71 which is secured to the framework 14. The remote end of the feeler constitutes a pointer 67 movable over a scale 68. The manner of operation of this device will be apparent from FIGURES 6, 7 and 8. The markings on the scale 68 are formed by holes in the metal of which such scale is constituted, the desired ultimate position being indicated by the maximum number of holes, such as the four holes shown at 72. The scale 68 is formed of an upwardly extending end portion of an arm 73 which is also pivotally mounted about the pin 69, the position of such arm being adjustable by means of a screw 74. The feeler 66, 67 will be balanced so as to be slightly biassed toward the glass, i.e., into the full line position as shown in FIGURE 9. On the other hand only a small force will be necessary to displace it from this position. As best appreciated from FIGURE 5, the pointer 67 and scale 68 are readily visible from the end of the mould for inspection through the conventional viewing ports in the wall of the lehr.

I claim:
1. In a glass bending mould having a skeleton shaping surface, mechanism for detecting the degree of bending of a glass sheet on said mould, such mechanism comprising a glass-contacting member, means pivotally mounting said glass-contacting member beneath said skeleton shaping surface and within the outline thereof to be beneath the position occupied by said glass and in substantially balanced condition while slightly biased towards the position occupied by said glass, and at least one fixed graduation mark arranged adjacent a portion of said glass-contacting member to indicate the extent of movement thereof on bending of the glass.

2. The structure of claim 1 wherein said graduation mark and the cooperating portion of the glass-contacting member are visible from the end of the mould for inspection through viewing ports in the wall of a lehr.

3. In a concave glass bending mould having a skeleton shaping surface, mechanism for detecting the degree of sag of a glass sheet on said mould, such mechanism comprising a support secured to the framework of the mould, an elongated member pivotally mounted on said support, the portion of said elongated member on one side of such pivot constituting a glass contacting finger disposed beneath said skeleton shaping surface and within the outline thereof to be beneath the position occupied by an unsupported area of said glass, and the portion of said elongated member on the other side of such pivot constituting an indicating pointer, said elongated member being substantially balanced about such pivot while slightly biassed towards the position in which said glass contacting finger is elevated, and a scale cooperating with said pointer.

4. The structure of claim 3, wherein said scale is pivotally mounted about said support, there being provided means for adjusting the position of said scale relatively to said support.

References Cited in the file of this patent
UNITED STATES PATENTS

| | | |
|---|---|---|
| 760,959 | Connington | May 24, 1904 |
| 833,436 | Borland et al. | Oct. 16, 1906 |
| 1,801,270 | Gray | Apr. 21, 1931 |
| 2,348,279 | Boyles et al. | May 9, 1944 |
| 2,491,631 | Wall et al. | Dec. 20, 1949 |
| 2,500,278 | Dunipace | Mar. 14, 1950 |
| 2,846,819 | Baker | Aug. 12, 1958 |